United States Patent [19]
Loomis

[11] 3,825,869
[45] July 23, 1974

[54] AIRCRAFT GROUND HANDLING EQUIPMENT

[75] Inventor: Francis B. Loomis, Brockville, Ontario, Canada

[73] Assignee: The St. Lawrence Engine Co. Limited, Brockville, Ontario, Canada

[22] Filed: July 11, 1973

[21] Appl. No.: 378,202

[30] Foreign Application Priority Data
Apr. 12, 1973 Canada .............................. 168532

[52] U.S. Cl.................. 214/331, 214/152, 214/750
[51] Int. Cl............................................ B60b 29/00
[58] Field of Search .......... 214/330, 331, 332, 333, 214/334, 620, 152, 621, 622, 750

[56] References Cited
UNITED STATES PATENTS

| | | | |
|---|---|---|---|
| 2,362,991 | 11/1944 | Dahl | 214/331 |
| 2,732,088 | 1/1956 | Arnot | 214/332 |
| 2,877,913 | 3/1959 | Arnot | 214/332 |
| 3,258,146 | 6/1966 | Hamilton | 214/331 |

Primary Examiner—Robert J. Spar
Assistant Examiner—Lawrence J. Oresky
Attorney, Agent, or Firm—Cushman, Darby & Cushman

[57] ABSTRACT

This relates to aircraft ground handling apparatus including a base member having an opening therein and an entry-way extending from a peripheral portion of the base member to said opening. An aircraft wheel engaging element is mounted on the base member in the region of the opening in the base member for rotation relative thereto about a generally vertical axis. The rotatable element has an entry-way therein leading into a free or open central region therein and arranged such that when said element is rotated to bring the entry-way thereof into general alignment with the entry-way in the base member, the base member may be advanced at a low level toward a wheel of an aircraft such that said wheel enters through said aligned entry-ways into the central region of said wheel engaging element. Means are provided for applying a torque to said element to rotate same through a selected angle relative to the base member. The wheel engaging element is sized and arranged to engage peripheral portions of the aircraft wheel to apply lifting forces to same when said base member is lifted after said element has been rotated through said selected angle relative to the base member.

8 Claims, 5 Drawing Figures

PATENTED JUL 23 1974 3,825,869

AIRCRAFT GROUND HANDLING EQUIPMENT

BACKGROUND OF THE INVENTION

This invention relates to improvements in aircraft ground handling apparatus and methods and is particularly related to aircraft handling operations in which it is necessary to manoeuvre one or more of the aircraft wheels by lifting same to clear the ground and then moving the aircraft by manual or mechanical power.

The cost and possibility of damaging the nosewheel of light and medium, single or twin engine aircraft of the tricycle landing gear variety has been an ever present problem to those who are required to carry out ground handling manoeuvres.

When moving such aircraft by hand a minimum of three men are required, one to manually steer the nosewheel and one man each on the wing tips to move the aircraft and watch for obstructions.

Certain types of mechanical devices have been developed over the years to reduce the labour factor and to increase efficiency. These devices are usually directly secured to the nosewheel and the aircraft is manipulated by steering the nosewheel in the direction required. Such devices have one major disadvantage in that serious structural damage can occur to the nosewheel of the aircraft by over-rotating the nosewheel in either direction.

Under taxiing or flight conditions the nosewheels of modern aircraft are steerable by the pilot and in most cases are an integral part of the aircraft rudder control. Nosewheel steering travel is approximately 30° either side of center, at which points "stops" are incorporated to prevent further turning. In ground handling if a nosewheel is forced past a "stop" physical damage usually occurs resulting in costly repairs and loss of the use of the aircraft for a period of time.

In an effort to resolve certain of these problems other devices have been developed. One of these is shown in the Arnot U.S. Pat. No. 2,732,088 issued Jan. 24, 1956. The Arnot aircraft handling device includes a steerable truck mounted on wheels. A divided ring member capable of assembly around a selected one of the aircraft wheels is provided. The truck has a lifting member having an opening in the front, which member is shaped to fit beneath and around the ring member. When the lifting member is raised the aircraft wheel clears the ground after which the aircraft may be moved to the desired position.

One problem with the Arnot arrangement is that the divided ring must have an internal shape suited to fit around the wheel and carrying fork of a particular aircraft. When different types of aircraft are to be handled, a number of divided rings must be provided. This can pose problems since the various rings must be stored somewhere and delays may be encountered if they cannot be located quickly. If the type of aircraft is not known when the ground handling equipment is dispatched, the operator may have to carry several ring adaptors with him in the hopes that one will fit properly. Of even greater importance is the fact that the fitting of the split ring assembly to the aircraft wheel and subsequent removal therefrom are separate time consuming steps.

SUMMARY OF THE INVENTION

It is an object of the present invention to alleviate many of the problems inherent in the prior art.

In accordance with one aspect of the invention there is provided aircraft ground handling apparatus including a base member having an opening therein and an entry-way extending from a peripheral portion of the base member to said opening. An aircraft wheel engaging element is mounted on the base member in the region of the opening in the base member for rotation relative thereto about a generally vertical axis. The rotatable element has an entry-way therein leading into a free or open central region therein and arranged such that when said element is rotated to bring the entry-way thereof into general alignment with the entry-way in the base member, the base member may be advanced at a low level toward a wheel of an aircraft such that said wheel enters through said aligned entry-ways into the central region of said wheel engaging element. Means are provided for applying a torque to said element to rotate same through a selected angle relative to the base member. The wheel engaging element is sized and arranged to engage peripheral portions of the aircraft wheel to apply lifting forces to same when said base member is lifted after said element has been rotated through said selected angle relative to the base member.

In a preferred form of the invention, the base member is mounted on a suitable powered lift truck or dolly which is capable of advancing the base member toward the aircraft wheel, raising the base member to clear the aircraft wheel from the ground and thereafter moving the aircraft as required.

In a further feature of the invention, anti-friction means are disposed between the rotatable element and the base member so that as the aircraft is being moved, the rotatable element is free to rotate thus avoiding the application of large torsional forces on the aircraft wheel.

In the preferred embodiment, the base member comprises a heavy metal plate having an arcuate opening and the access way machined therein. The rotatable element comprises an arcuate plate mounted in said arcuate opening in the base plate and supported on a plurality of angularly spaced antifriction rollers. Additional arcuate adapter elements may be mounted on the primary element to increase the range of wheel sizes the device is capable of handling.

The invention further relates to an improved method of handling aircraft as set forth in certain of the claims appearing hereafter.

BRIEF DESCRIPTION OF THE VIEWS OF DRAWINGS

In the drawings which illustrate, by way of example, an embodiment of the invention:

DESCRIPTION OF THE PREFERRED EMBODIMENT

Figure 1:
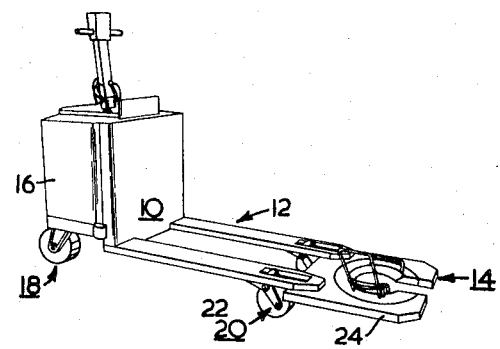
FIG. 1 is a perspective view of aircraft ground handling equipment incorporating the principles of the invention.

FIG. 1 shows a powered dolly 10 which is, per se, of a well known commercially available variety including an elongated frame 12 at the front end of which is carried the aircraft wheel engaging assembly 14. At the rear end of frame 12 is a motor compartment 16 carrying control levers for directional control of the dolly 10 and for effecting raising or lowering of assembly 14. The rear of frame 12 is supported by powered swivelling wheels 18 while the front portion of frame 12 is supported by a pair of wheels 20 each of which is mounted to a short pivotted arm 22, the arms 22 being caused to pivot through a short arc of travel by means of a hydraulic cylinder (not shown) whereby to selectively raise or lower the front end of frame 12 in a manner similar to that shown in U.S. Pat. No. 2,732,088, FIGS. 2 and 3, and thus effect corresponding changes in the elevation of the assembly 14.

Figure 2:
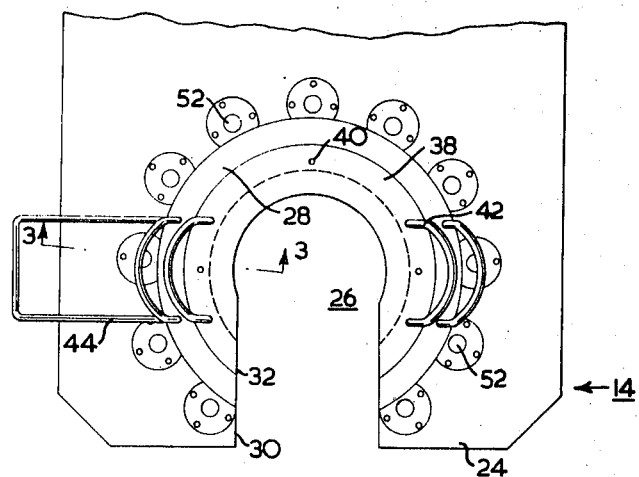
FIG. 2 is a plan view of the base member-rotatable element assembly.
Figure 3:
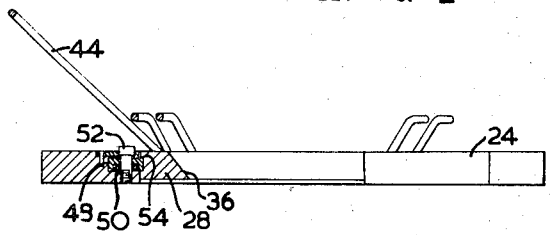
FIG. 3 is an end elevation view of the assembly of FIG. 2 taken partly in section along line 3-3 in FIG. 2.

With reference to FIGS. 2 and 3, the aircraft wheel engaging assembly 14 includes a base member 24 comprising a heavy steel plate having a generally circular central opening 26 machined therein and within which is rotatably mounted a wheel engaging element 28 in the form of an arcuate plate. The base member 24 has an entry-way 30 extending from its frontal edge inwardly to central opening 26 while the wheel engaging element 28 has a similar entry-way 32 defined therein extending into a free or open central region of the wheel engaging element 28. The two entry-ways 30 and 32 provide, when element 28 is properly positioned angularly relative to base member 24, an access way of sufficient width as to permit an aircraft wheel to pass therethrough into the central region of the wheel engaging element 28.

The open central region of wheel engaging element 28 is sized such that it has a dimension or diameter which is somewhat less than the diameter of the smallest aircraft wheel which is intended to be handled thereby. In order to avoid undue pressure on the aircraft tire and possible damage to same, the inwardly facing surface of the wheel engaging element 28 is bevelled downwardly and inwardly thereby to provide a generally conical tire contacting surface 36.

In order to increase the flexibility of the apparatus and in order to enable it to handle a wider range of aircraft wheel sizes, the rotatable element 28 may be provided with one or more adapter rings 38 as shown in FIGS. 2 and 3, which adapter rings rest on wheel engaging element 28 against the above mentioned surface 36. Suitable pin dowel means 40 prevent relative rotation between adapter rings 38 and wheel engaging element 28. By adding further adapter rings 38, progressively smaller aircraft wheel sizes may be accommodated. Each of the adapter rings 38 is, of course, provided with a suitable access way sized to correspond with access way 30 and 32 provided in base member 24 and element 28 respectively. Each adapter ring 38 is conveniently provided with opposed handle means 42 to permit the operators to lift the adapter rings into or out of position relative to rotatable elements 28.

In order to apply torque to the rotatable element 28, an elongated handle 44 is rigidly secured thereto, which handle may readily be grasped by the operator to effect rotation of element 28 and any adapter plates 38 mounted thereon.

As mentioned previously, anti-friction means are disposed between rotatable element 28 and base member 24 so as the aircraft is being moved, the element 28 is free to rotate thus avoiding the application of large torsional forces on the aircraft wheel which might tend to damage the aircraft control system. For this purpose, the base plate 24 includes, as best seen in FIG. 3, a plurality of angularly spaced rollers 48 each of which is provided with suitable ball bearings 50 to permit free rotation thereof. Rollers 48 are each provided with a stud 52 securely threaded into the base plate 24. The upper peripheral portion of each of the rollers 48 engages with a ledge portion 54 machined on the outer edge of the rotatable element 28.

Figure 4:
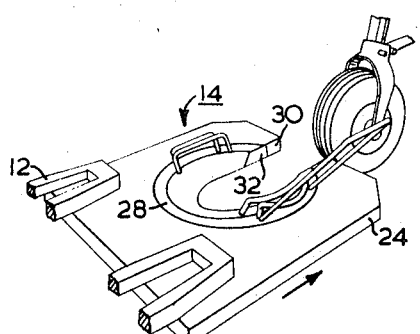
FIGS. 4 and 5 are perspective views illustrating the method of use of the equipment.
Figure 5:
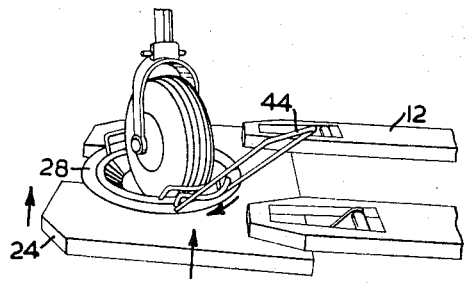

In the operation of the apparatus as illustrated in FIGS. 4 and 5, the element 28 is rotated relative to base plate 24 to bring the entry-ways 30 and 32 into alignment with one another. The dolly 10 is then advanced towards the aircraft wheel as illustrated in FIG. 4 so that the aircraft wheel enters via the aligned entry-ways into the central region defined by the rotatable element 28 and/or any adapter plates carried thereby. During this time, the support wheels 20 at the front end of the dolly are, of course, arranged such that the base member 24 is relatively close to the ground level. Then, the operator grasps handle 44 and effects rotation of the element 28 through an angle of about 90°. This is shown in FIG. 5. This effectively serves to "lock in" the aircraft wheel after which the front end portion of the dolly is raised upwardly so that the rotatable element 28 makes contact with the aircraft wheel thus lifting same clear of the ground. The apparatus is then ready to provide for ground manoeuvring of the aircraft safely and efficiently. Because of the fact that rotatable element 28 is free to rotate readily relative to the base member 24 by virtue of the ball bearing mounted rollers referred to above, there is virtually no possibility of the aircraft wheel being twisted around during ground handling operations and thus damaging the control systems.

It will be therefore seen that the present invention provides a simple yet very effective design capable of trouble-free performance which may be produced relatively economically. The aircraft wheel engaging assembly 14 is adaptable to many different varieties of dollies, standard power pallet vehicles or fork lift trucks depending on the size of aircraft to be moved. The operation of the apparatus is convenient, simple and fast. Additional advantages of applicants' invention will be apparent to those skilled in the art.

I claim:
1. Aircraft ground handling apparatus including a base member having an opening therein and an entry-way extending from a peripheral portion of the base member to said opening, an element mounted on said base member in the region of said opening for rotation relative to the base member about a generally vertical axis, said rotatable element having an entry-way therein leading into a free or central open region and arranged such that when said element is rotated to bring the entry-way thereof into general alignment with the entry-way in said base member, the base member may be advanced at a low level toward a wheel of an aircraft such that said wheel enters through said aligned entry-ways into the central region of said element, means for applying torque to said element to rotate same through a selected angle relative to said base member, the element being sized and arranged to engage peripheral portions of the aircraft wheel and to lift the wheel when said base member is raised after the element has been rotated through said selected angle relative to said base member, and means for raising and lowering said base member to enable the aircraft wheel to raised or lowered respectively.

2. Apparatus according to claim 1 further including anti-friction means disposed between the rotatable element and the base member so that as the aircraft is being moved, the rotable element is free to rotate relative to the base member thus avoiding the application of large torsional forces on the aircraft wheel.

3. Apparatus according to claim 1 wherein the opening in said base member is arcuate in form and wherein the rotatable element comprises an arcuate plate mounted in said arcuate opening in the base plate and supported on a plurality of angularly spaced anti-friction bearings.

4. The apparatus according to claim 3 including arcuate adapter elements mounted on said first mentioned arcuate plate and means for preventing relative rotation therebetween.

5. Apparatus according to claim 1 further including a powered dolly having said base member securely mounted thereto, said dolly including said means for raising or lowering said base member to enable the aircraft wheel to be raised or lowered respectively.

6. Apparatus according to claim 2 further including a powered dolly having said base member securely mounted thereto, said dolly including said means for raising or lowering said base member to enable the aircraft wheel to be raised or lowered respectively.

7. Apparatus according to claim 1 wherein said element includes an inwardly and downwardly bevelled aircraft wheel contacting surface.

8. A method of handing aircraft on the ground comprising providing a base member having an opening therein and an entry-way extending into said opening with a wheel-engaging element having a corresponding entry-way disposed therein rotatably mounted on said base member, said rotatable element having a free or open central region therein, the dimension across the open central region being somewhat less than the diameter of the aircraft wheel to be handled so that when said element is rotated through a selected angle relative to the wheel, said element is capable of engaging beneath peripheral portions of the wheel, advancing said base member at a low level relative to the ground towards said aircraft wheel with said entry ways in correspondence with one another in such fashion that said wheel enters into said free or open central region of the rotatable element, rotating said rotatable element through said selected angle relative to said base member, thereafter raising said base member so as to bring the rotatable element into contact with said aircraft wheel and to lift the aircraft wheel from the ground, thereafter moving the aircraft to a desired location by advancing the base member while maintaining the aircraft wheel clear of the ground.

* * * * *